3,189,561
IMPROVEMENT OF THE ACTIVITY OF PALLADIUM HYDROGENATION CATALYSTS BY HIGH ENERGY IRRADIATION

Donald P. Graham, Brandywine Hundred, Del., assignor to E. I. du Pont de Nemours and Company, Wilmington, Del., a corporation of Delaware
No Drawing. Filed Jan. 12, 1961, Ser. No. 82,173
5 Claims. (Cl. 252—447)

This invention relates to increasing the activity of palladium hydrogenation catalysts. More particularly this invention relates to increasing the activity of palladium hydrogenation catalysts by high energy irradiation.

Numerous physical and chemical treatments have been investigated for the purpose of improving the activity of catalysts. It is well known that slight variation in the preparation of catalysts can markedly alter the activity of the catalyst and it is impossible to predict the effect of any particular treatment on a catalytic material. In recent years radiation of catalysts has been attempted to enhance activation and several catalysts have been exposed to gamma radiation. However, the result of irradiation is unpredictable. For example, the hydrogenation catalyst zinc oxide, after subjection to gamma irradiation, showed a decreased activity for hydrogenation of ethylene. A discussion of prior research in this field has been given by E. H. Taylor in his article "Radiation Effects on Solids, Including Catalysts," in J. Chem. Educ. 36, 396 (1959).

It is an object of this invention to provide a process for preparing activated palladium hydrogenation catalysts. Another object is to provide a process for increasing the activity of a palladium catalyst with high energy radiation. A still further object of this invention is to provide increased activity of palladium hydrogenation catalyst which reduces the time required for the hydrogenation reaction. Other objects will appear hereinafter.

These and other objects of this invention are accomplished by exposing the palladium catalyst to high energy radiation particularly beta-rays, X-rays, neutrons and deuterons. Any of the sources of high energy radiations which provide the designated energy levels can be used, such as the Van de Graaff accelerator, Crockcroft Walton accelerator or betatron for the beta and X-rays, and the cyclotron synchrotron or linear accelerator can be used for the heavier particles. These high energy radiations affect the crystal structure of the palladium catalyst by producing additional active centers which are necessary for the catalytic hydrogenation reactions.

A preferred process is the treatment of a supported palladium hydrogenation catalyst with 1½ to 3 million electron volts of beta radiation in dosage of 2,000 to 30,000 watt-seconds per square centimeter.

Another preferred process is the treatment of a supported palladium hydrogenation catalyst with 1½ to 3 million electron volts of X-radiation in dosage of $1 \times 10^5$ to $1 \times 10^7$ reps. (Roentgen equivalent physical).

A further preferred process is the treatment with neutron radiation in dosage of $1 \times 10^{15}$ to $1 \times 10^{17}$ neutrons per square centimeter.

The catalyst can be cooled during the irradiation, if desired, should overheating occur with continuous irradiation at higher wattages or intermittent irradiation can be employed.

Another preferred process is the treatment with deuteron radiation at 15 million electron volts and 20 microamperes for 20 to 40 seconds. The palladium catalysts irradiated in the subject invention are well known in the art and commonly used in commercial hydrogenation reactions. They may be conveniently prepared according to the method described in U.S. Patent No. 2,857,337, wherein a solution of palladium chloride in aqueous alkaline metal bicarbonate is heated in the presence of an activated carbon to 95° C. for 15–20 minutes. Aqueous formaldehyde is added and the mixture is cooled, filtered, washed and dried.

Other palladium catalysts are used which are promoted by iron, platinum or iron and platinum. These catalysts may be prepared according to the method described in U.S. Patent No. 2,823,235, wherein a metal compound, such as ferric chloride or chloroplatinic acid, is added to the activated carbon slurry with the palladium chloride to form a metal promoted palladium catalyst.

Example 1

A catalyst comprising 5% palladium on activated carbon was prepared and reduced as described in U.S. Patent No. 2,857,337, Example 1, and dried in an oven at 100° C. A 0.5 g. sample of this catalyst was spread on the bottom of a 2" x ½" round culture dish and the dish tightly covered with 1 mil thick aluminum foil. The sample was subjected to beta radiation by repeated passage through the beam of a Van de Graaff accelerator of 2 mev. and 10 watts per sq. cm. Each pass involved an exposure of 1.1 seconds. The sample was exposed for a total of 1025 seconds. The irradiated catalyst showed an activity increase of 13%.

Example 2

By following the details of Example 1 and irradiating the catalyst for a total of 275 seconds, the activity increased by 6%.

Example 3

By following the details of Example 1 and irradiating the catalyst for a total of 55 seconds, the activity increased by 2%.

Example 4

A 2.0 g. sample of a catalyst prepared and reduced as described in Example 1 was subjected to beta radiation from a Van de Graaff generator at 2 mev. and 10 watts per sq. cm. for a constant exposure of 660 seconds. The catalyst showed a 10% increase in activity.

Example 5

A sample of 2.0 g. dry reduced palladium catalyst, prepared as described in Example 1, was spread in a 2" x ½" round culture dish and covered with 1 mil thick aluminum foil. The sample was irradiated with 2 mev. X-rays produced by allowing the electron beam from a Van de Graaff generator to impinge on a 2 mm. gold target. A dosage of $5 \times 10^5$ reps. produced an increase in activity of 7%.

Example 6

By following the details of Example 5, a dosage of $5 \times 10^6$ reps. produced an increase in activity of 3%.

Example 7

A 0.5 g. sample of a dry, reduced catalyst prepared as described in Example 1 was wrapped in 1 mil thick aluminum foil to form an annular package. The shape was determined by the use of a jig, the foil being sealed by pounding on the jig. The sample was irradiated by a neutron beam of $6 \times 10^{14}$ n./cm.$^2$/min. from a cyclotron for 30 minutes. The catalyst showed an increase in activity of 16%.

Example 8

A catalyst comprising 4.5% palladium, 0.5% platinum and 5% ferric iron (as hydroxide) prepared as described in Example 22 of U.S. Patent No. 2,823,235 was reduced by adding 330 parts of catalyst paste (30% solids) to a solution of 75 parts sodium bicarbonate in 300 parts water at room temperature. The suspension was heated to 90° C. and a solution of 50 parts 30% formaldehyde in 100 parts water was added over a period of ½ hour at 90–93° C. The temperature was held at 90–91° C. for an additional ½ hour. The charge was cooled, filtered, washed with ice water and dried at 95–100° C.

A 2.0 g. sample of dry catalyst prepared as above was spread evenly in a 2″ x ½″ round culture dish and tightly covered with 1 mil thick aluminum foil. The sample was subjected to beta radiation by intermittently passing it through the beam of a Van de Graaff electron accelerator at 2 mev. and 10 watts per sq. cm. for a total exposure of 110 seconds. The activity of the irradiated catalyst showed an increase of 5%.

*Example 9*

A 2.0 g. sample of catalyst prepared and reduced as described in Example 8 showed an increase of 10% in activity after exposure to the beam of a Van de Graaff electron accelerator at 2 mev. and 10 watts per sq. cm. continuously for 660 seconds.

*Example 10*

A 2.0 g. sample of catalyst prepared and reduced as described in Example 8 showed an increase of 48% activity after 1045 seconds exposure by passing 950 times through a beam of a Van de Graaff electron generator at 2 mev. and 10 watts per sq. cm.

*Example 11*

A 2.0 g. sample of catalyst prepared and reduced as described in Example 8, was placed in a 2″ x ½″ round culture dish and tightly covered with 1 mil thick aluminum foil. The sample was subjected to 2 mev. X-rays produced by allowing the electron beam of a Van de Graaff generator to impinge on a 2 mm. gold target. A dosage of $5 \times 10^5$ reps. produced an increase of 6% in activity.

*Example 12*

A 2.0 g. sample of catalyst prepared as described in Example 8, except that it was dried at 80–90° C. under reduced pressure of 3–4 mm. Hg was subjected to X-radiation by following the details of Example 11, for $5 \times 10^5$ reps. exposure. An increase in activity of 25% was observed.

*Example 13*

By following the details of Example 12 for an exposure of $5 \times 10^6$ reps., the catalyst showed an increase in activity of 3%.

*Example 14*

A 0.5 g. sample of a catalyst prepared as described in Example 8 was wraped in 1 mil thick aluminum foil to form an annular package. The shape was determined by use of a jig and the foil was sealed by pounding on the jig. The sample was irradiated in the neutron beam of $6 \times 10^{14}$ n./cm.$^2$/min. produced in a cyclotron for 30 minutes. The catalytic activity increased by 8%.

*Example 15*

A 0.5 g. sample of a catalyst prepared and reduced as described in Example 8, and dried at 80–90° at 3–4 mm. Hg pressure was packaged as described in Example 14 and subjected to deuteron radiation from a cyclotron at 15 mev. and 20 microamperes for thirty seconds. The catalyst showed an increase in activity of 16%.

*Example 16*

A 2.0 g. sample of a platinum promoted palladium catalyst prepared as described in U.S. Patent No. 2,823,235, Example 22, with the exception that the iron salt and 4% of the sodium bicarbonate were omitted, was placed in a 2″ x ½″ round culture dish and covered tightly with a 1 mil thick aluminum foil. The sample was irradiated with beta-rays from a 2 mev. electron beam of a Van de Graaff generator at 10 watts per sq. cm. continuously for 660 seconds. The activity increased by 10%.

*Example 17*

By following the details of Example 16, a 2.0 g. sample showed an increase in activity of 27% after irradiation at 3 mev. and 15 watts per sq. cm. for 660 seconds.

*Example 18*

A catalyst comprising 5% palladium and 5% ferric iron prepared as described in Example 9 of U.S. Patent No. 2,823,235, and reduced as described in Example 8 of this memorandum, was dried at 80–90° at 3–4 mm. Hg pressure. A 2.0 g. sample of this catalyst was spread in a 2″ x ½″ round culture dish and covered tightly with 1 mil thick aluminum foil. The sample was subjected to beta radiation by exposing in an electron beam at 2 mev. and 10 watts per sq. cm. continuously for 660 seconds. An increase in activity of 10% was observed.

*Example 19*

By following the details of Example 18, a 2.0 g. sample showed an increase in activity of 24% after irradiation at 3 mev. and 15 watts per sq. cm. for 660 seconds.

The activity of the catalyst in each of the above examples was determined by the following method. The apparatus used was a flatbottomed flask equipped with a 10 ml. buret and a magnetically controlled stirrer bar, immersed in a constant temperature water bath, and connected to a water-jacketed gas buret filled with mercury and maintained at a constant temperature. The flask was rinsed with acetic acid and the system flushed with nitrogen. A 20 mg. sample of catalyst, as described in Examples 1–7, or 4 mg. of catalyst as described in Examples 8–19, and 25 cc. of acetic acid were charged into the flask. The system was flushed with nitrogen five times at 2 atmospheres of pressure, the last being released through the buret. This was repeated using hydrogen, repressurizing with hydrogen at 2 atmospheres. The buret was filled with a 10% solution of p-nitrotoluene in glacial acetic acid and hydrogen was bubbled through to remove air. A sample comprising 2 cc. of the p-nitrotoluene solution was added to the reaction flask and the rate of hydrogen take-up was measured. This was repeated twice. The first 10% and the last 20% were disregarded to eliminate the effects of the initial induction period and the p-nitrotoluene concentration fall-off at the end. The activation of the catalyst was evaluated by comparing the rate of absorption of hydrogen using the irradiated catalyst with that of the standard catalyst.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for increasing the activity of a carbon-supported palladium hydrogenation catalyst which comprises irrradiating said catalyst with a form of high energy irradiation selected from the group consisting of beta-radiation, X-radiation, neutron-radiation and deuteron-radiation, said beta-radiation consisting essentially of irradiating said catalyst with 1½ million electron volts of beta-radiation in dosage of 2000 to 30,000 watt-seconds per square centimeter, said X-radiation consisting essentially of irradiating said catalyst with 1½ to 3 million electron volts of X-radiation in dosage of $1 \times 10^5$ to $1 \times 10^7$ reps., said neutron-radiation consisting essentially of irradiating said catalyst in dosage of $1 \times 10^{15}$ to $1 \times 10^{17}$ neutrons per square centimeter, said deuteron-radiation consisting essentially of irradiating said catalyst with deuteron-radiation at 15 million electron volts and 20 microamperes for 20 to 40 seconds.

2. A process for increasing the activity of a carbon-supported palladium hydrogenation catalyst which comprises irradiating said catalyst with 1½ to 3 million electron volts of beta radiation in dosage of 2000 to 30,000 watt-seconds per square centimeter.

3. A process for increasing the activity of a carbon-supported palladium hydrogenation catalyst which comprises irradiating said catalyst with 1½ to 3 million electron volts of X-radiation in dosage of $1 \times 10^5$ to $1 \times 10^7$ reps.

4. A process for increasing the activity of a carbon-supported palladium hydrogenation catalyst which comprises irradiating said catalyst with neutron radiation in dosage of $1 \times 10^{15}$ to $1 \times 10^{17}$ neutrons per square centimeter.

5. A process for increasing the activity of a carbon-supported palladium hydrogenation catalyst which comprises irradiating said catalyst with deuteron radiation at 15 million electron volts and 20 microamperes for 20 to 40 seconds.

References Cited by the Examiner
UNITED STATES PATENTS

| | | | |
|---|---|---|---|
| 2,823,235 | 2/58 | Graham et al. | 252—447 X |
| 2,905,608 | 9/59 | Noddings et al. | 252—411 X |
| 2,983,690 | 5/61 | Bertolacini | 252—463 |
| 3,002,910 | 10/61 | Caffrey | 252—472 X |
| 3,051,737 | 8/62 | Gibson | 204—162 |
| 3,074,880 | 1/63 | Domash et al. | 252—466 |

MAURICE A. BRINDISI, *Primary Examiner.*
JULIUS GREENWALD, *Examiner.*